L. LANGHAM.
LOW PRESSURE ALARM FOR PNEUMATIC TIRES.
APPLICATION FILED SEPT. 21, 1917.
1,291,647.
Patented Jan. 14, 1919.
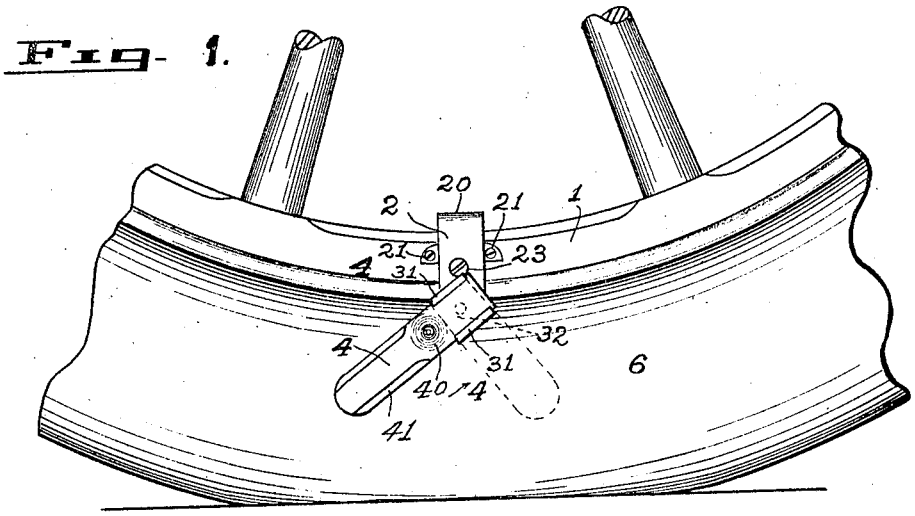
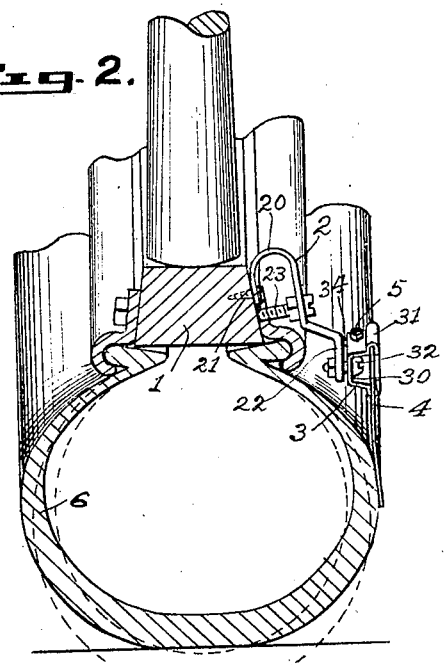
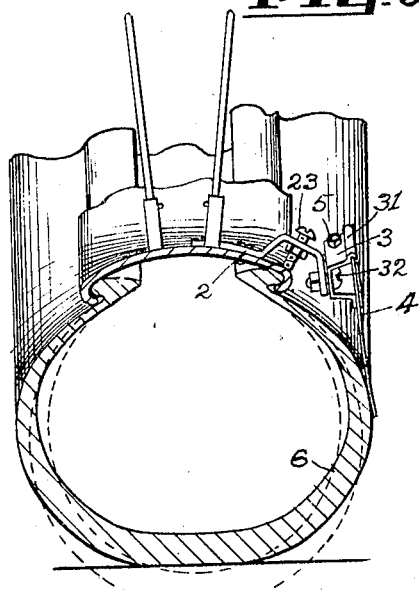
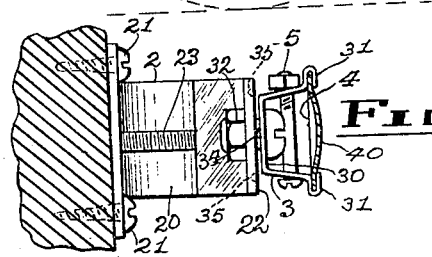
Inventor
LUDWIG LANGHAM.
By Henry L. Reynolds.
His Attorney

UNITED STATES PATENT OFFICE.

LUDWIG LANGHAM, OF SEATTLE, WASHINGTON.

LOW-PRESSURE ALARM FOR PNEUMATIC TIRES.

1,291,647.  Specification of Letters Patent.  Patented Jan. 14, 1919.

Application filed September 21, 1917. Serial No. 192,430.

*To all whom it may concern:*

Be it known that I, LUDWIG LANGHAM, a German subject who has taken out his first United States citizenship papers, and resident of Seattle, county of King, and State of Washington, have invented certain new and useful Improvements in Low-Pressure Alarms for Pneumatic Tires, of which the following is a specification.

My invention relates to devices adapted to be applied to a wheel which is provided with a pneumatic tire and to act in such way as to give a warning in case the air escapes from the tire to such an extent as to allow it to compress more than is desirable. My device may thus be termed an automatic alarm for deflated tires.

The object of my invention is to provide a device which will give an alarm whenever the tires lose enough air so as to become softer than is desirable.

My invention comprises the novel devices and combinations of parts which will be hereinafter described and then particularly defined by the claims.

In the accompanying drawings I have shown the manner in which I now prefer to construct my device.

Figure 1 is a side view of a section of a wheel showing my device mounted thereon.

Figs. 2 and 3 are cross sectional views of a wheel rim and tire, showing my device mounted thereon, different means for supporting the same being shown in the respective figures.

Fig. 4 is a section taken upon the line 4—4 of Fig. 1, but with the arm 4 in alinement with the supporting base 2.

It is well known that the life of a pneumatic tire is much prolonged if it is never permitted to run insufficiently inflated. In other words, the excessive bending occurring in the body of the tire due to insufficient pressure of air produces friction in the body of the tire which rapidly wears it out. The purpose of my device is to provide means whereby a warning will be given as soon as the tire becomes deflated beyond a predetermined point.

My invention contemplates the use of an arm which normally contacts with the side surface of a tire and which, while the tire is sufficiently inflated, is not acted upon in such manner as to produce any warning but which, when forced outward by the undue compression of the tire, such as would occur when the pressure is lower, will actuate a warning device, thus advising the driver that the tire has lost enough air to put it in condition for undue wear.

The manner of constructing a device operating upon this principle, may be widely varied. The construction herein shown and now to be described, is one manner of securing this result, and is given as illustrative of the principle of my invention.

I employ a base member which is secured to the rim of the wheel and along with this an arm which is mounted upon this base member by means of a pivot, the axis of which is substantially parallel with the axis of the wheel, said arm extending down into engagement with the side surface of the tire. The shape and construction of the base member may be varied to fit varying conditions. In Figs. 1 and 2, I have shown the device as mounted upon a wheel rim, the body of which is of wood. This rim 1 has the base member 2 secured to a side face by means of screws 21. The base member is provided with a curve or loop 20 which permits a certain amount of spring yielding of its outer end 22. This permits a certain range of adjustment in the position of the outer end of this member through the action of a screw or bolt 23 which passes through the outer portion of the base member 2 and which engages the wheel rim.

The outer end 22 has its outer face substantially parallel with the plane of the wheel. Pivotally mounted upon this end 22, is an arm-supporting member 3. This member preferably partakes of the character of a socket, as it is provided with means for removably holding an end of the arm 4 which engages the outer side surface of the wheel tire. Its central portion 30 fits against the face of the end 22 of the base member. The ends thereof are turned outward and have their outer end edges curved outward and then inward to provide sockets 31 for receiving the edges of the arm 4.

The arm 4 is made of a thin strip of steel. Its edges fit snugly within the sockets 31. This may be clamped in place by means of a bolt 5 which passes through the side wings of the member 3 and by which these wings may be clamped upon the edges of the arm 4.

The socket member 3 and the outer face of the end 22 of the base member, are provided with mutually engaging projection and recess, so located as to engage when the arm 4 is in its working position. As herein shown the socket member 3 has a slightly projecting point 34 which is adapted to enter one or the other of two recesses 35, which are formed in the outer face of the end 22. The pivot bolt 32, by which the socket member 3 is supported from the base member, is located toward one side of said socket member and the projecting point 34 is toward the opposite side thereof. These parts are designed to have a sufficient amount of give or spring, to permit the engagement and removal of these interlocking parts. The arm 4 will occupy either the position shown by the full lines or that shown by dotted lines in Fig. 1, when these interlocking parts are in engagement.

The arm 4 has a section at 40 which lies closely adjacent to its socket member, buckled in such a way that when the arm is sprung and bends at this point, it will produce a snapping noise, one which would be easily heard by the driver. This snapping will occur on the recovery as well as when it is bent outward. The natural spring of this arm is such as to cause it to return it to the normal inward position as soon as the outward pressure of the tire, due to its compression, has been removed.

To prevent any considerable measure of bending of this arm from occurring toward the outer end thereof, I prefer to stiffen or strengthen the outer part of this arm by slightly bending up its edges 41, as has been indicated in Fig. 1. This stiffens this part of the arm and localizes the bending effect mainly in the section 40, which is buckled or made concaved in its cross section. The type of this cross section is shown by the section in Fig. 4, in which the amount of the curvature has been somewhat exaggerated.

The arm 4 being placed in an angular position with reference to the radius of the wheel, as is seen in Fig. 1, will, when the tire has become compressed to such a point that the arm engages the ground, be forced upward into a position parallel with the tangent of the wheel rim, in which position it will not be injured by the compression of the tire. If this arm in its working position was in a position radial of the wheel, it would, under the same circumstances of the tire going flat, be broken off.

In Fig. 3 I have shown how the base member 3 may be modified to be adapted for attachment to a metal rim. In this case the inner end thereof extends transversely of the rim and is secured to its inner surface. The screw 23, by which the position of the outer end of this base is adjusted, is shown as engaging the outer edge of the wheel rim.

By the use of a device of this sort, an alarm is automatically given whenever the wheel tire becomes deflated to such point that its compression is more than is desired. When this occurs, the arm 4 is bent outward whenever that side of the wheel contacts with the ground and recovers immediately it rises from the position next to the ground. In consequence, there are two snapping sounds at each revolution of the wheel, these sounds being loud enough to be readily heard and thus to give warning that the pressure in the tire has been reduced below that which is desirable.

What I claim as my invention is:

1. A device for giving warning of soft pneumatic tires comprising a bar supported by a pivot which is inward of the tire and has its axis substantially parallel with the axis of the wheel, said bar when in use extending outwardly from the wheel center in the general plane of the wheel and at an angle with a wheel radius and being adapted to swing inward upon its pivot in case of contact with the ground.

2. A device for giving warning of soft pneumatic tires comprising a bar adapted to give an audible signal when bent flatwise, means for supporting it upon a pivot by one end with its other end engaging the side of the tire, and means for yieldingly holding said bar in a position at an angle with a wheel radius, whereby said bar will be bent flatwise by the flattening of the tire.

3. A device for warning of soft tires comprising a plate adapted to be secured to the wheel rim and having an outwardly facing surface approximately parallel with the plane of the wheel, a socket piece pivoted against this face, and a spring plate arm fitting said socket and having the side face of its outer end engaging the side face of the tire, said arm having a section adjacent its support buckled to thereby snap when bent and outwardly therefrom stiffened to thereby localize the bending at the buckled section.

Signed at Seattle, Washington, this 12th day of September, 1917.

LUDWIG LANGHAM.